United States Patent
Nair et al.

(10) Patent No.: US 9,060,318 B2
(45) Date of Patent: Jun. 16, 2015

(54) SYSTEM FOR ECO-FRIENDLY MANAGEMENT OF CONNECTED DEVICES

(75) Inventors: Biju Nair, Long Grove, IL (US); Christopher A. Heistad, Rienbeck, IA (US); Darryl Lovato, Royal Oaks, CA (US)

(73) Assignee: SMITH MICRO SOFTWARE, INC., Aliso Viejo, CA (US)

( * ) Notice: Subject to any disclaimer, the term of this patent is extended or adjusted under 35 U.S.C. 154(b) by 634 days.

(21) Appl. No.: 12/545,759

(22) Filed: Aug. 21, 2009

(65) Prior Publication Data

US 2011/0044177 A1    Feb. 24, 2011

(51) Int. Cl.
| | |
|---|---|
| *H04W 4/00* | (2009.01) |
| *H04W 36/26* | (2009.01) |
| *H04W 48/18* | (2009.01) |
| *H04L 12/24* | (2006.01) |
| *H04W 48/02* | (2009.01) |
| *H04W 48/04* | (2009.01) |
| *H04W 48/16* | (2009.01) |
| *H04W 48/20* | (2009.01) |
| *H04W 88/06* | (2009.01) |

(52) U.S. Cl.
CPC .......... *H04W 36/26* (2013.01); *H04L 41/0816* (2013.01); *H04L 41/12* (2013.01); *H04W 48/02* (2013.01); *H04W 48/04* (2013.01); *H04W 48/16* (2013.01); *H04W 48/18* (2013.01); *H04W 48/20* (2013.01); *H04W 88/06* (2013.01)

(58) Field of Classification Search
CPC ..... H04W 24/00; H04W 84/12; H04W 80/04; H04W 84/18; H04W 88/06; H04W 74/08; H04L 43/50; H04L 43/0852; H04L 43/08; H04B 17/003

USPC ............ 370/331, 338; 455/456, 414; 340/539
See application file for complete search history.

(56) References Cited

U.S. PATENT DOCUMENTS

| | | | | |
|---|---|---|---|---|
| 6,144,855 | A * | 11/2000 | Slovin ........................ | 455/432.1 |
| 6,782,264 | B2 * | 8/2004 | Anderson ................. | 455/456.1 |
| 6,801,777 | B2 * | 10/2004 | Rusch ........................ | 455/452.2 |
| 7,058,059 | B1 * | 6/2006 | Henry et al. ............... | 370/395.1 |
| 7,116,988 | B2 * | 10/2006 | Dietrich et al. ............ | 455/456.1 |
| 7,133,677 | B2 * | 11/2006 | Feder et al. .................... | 455/443 |
| 7,305,232 | B2 * | 12/2007 | Ono et al. .................... | 455/456.1 |
| 7,596,120 | B2 * | 9/2009 | Kim et al. ..................... | 370/331 |
| 7,623,486 | B2 * | 11/2009 | Caldwell et al. .............. | 370/328 |
| 7,653,392 | B2 * | 1/2010 | Ovadia et al. ............... | 455/435.2 |
| 8,019,352 | B2 * | 9/2011 | Rappaport et al. ......... | 455/456.1 |
| 8,073,492 | B2 * | 12/2011 | Karaoguz et al. ............ | 455/566 |
| 2002/0129138 | A1 * | 9/2002 | Carter .......................... | 709/224 |
| 2003/0087635 | A1 * | 5/2003 | Sheffield ..................... | 455/423 |
| 2004/0142693 | A1 * | 7/2004 | Feder et al. .................... | 455/443 |
| 2004/0152472 | A1 * | 8/2004 | Ono et al. .................. | 455/456.1 |
| 2005/0096068 | A1 * | 5/2005 | Bahl et al. .................. | 455/456.1 |
| 2005/0107038 | A1 * | 5/2005 | Coutts .......................... | 455/41.2 |
| 2006/0019679 | A1 * | 1/2006 | Rappaport et al. ......... | 455/456.5 |
| 2007/0010257 | A1 * | 1/2007 | Capuzzello et al. ....... | 455/456.1 |
| 2007/0073718 | A1 * | 3/2007 | Ramer et al. ..................... | 707/10 |

(Continued)

*Primary Examiner* — Steven H Nguyen
(74) *Attorney, Agent, or Firm* — Craig M. Stainbrook; Stainbrook & Stainbrook, LLP

(57) ABSTRACT

A system and method for a connected wireless device to hand off from one network to another based on empirical data gathered from real live networks regarding the grade of service available on the network. The invention uses this information in combination with the user's choice of a preferred type of network connection to intelligently manage and conserve device battery life.

12 Claims, 5 Drawing Sheets

(56) References Cited

U.S. PATENT DOCUMENTS

| | | | |
|---|---|---|---|
| 2007/0111748 A1* | 5/2007 | Risbood | 455/550.1 |
| 2007/0135159 A1* | 6/2007 | Sinivaara | 455/552.1 |
| 2007/0217349 A1* | 9/2007 | Fodor et al. | 370/310.2 |
| 2007/0253339 A1* | 11/2007 | Ovadia et al. | 370/252 |
| 2007/0298805 A1* | 12/2007 | Basak et al. | 455/446 |
| 2008/0052083 A1* | 2/2008 | Shalev et al. | 704/500 |
| 2008/0240052 A1* | 10/2008 | Gupta et al. | 370/338 |
| 2008/0310371 A1* | 12/2008 | Russell | 370/331 |
| 2008/0311889 A1* | 12/2008 | Dunko et al. | 455/414.1 |
| 2009/0122739 A1* | 5/2009 | Yonezawa | 370/312 |
| 2009/0131020 A1* | 5/2009 | van de Groenendaal | 455/411 |
| 2009/0181725 A1* | 7/2009 | Koncelik, Jr. | 455/566 |
| 2009/0288139 A1* | 11/2009 | Huber et al. | 726/2 |
| 2009/0316671 A1* | 12/2009 | Rolf et al. | 370/338 |
| 2009/0322510 A1* | 12/2009 | Berger et al. | 340/539.1 |
| 2011/0026506 A1* | 2/2011 | Macnaughtan et al. | 370/338 |
| 2011/0158216 A1* | 6/2011 | Zaks | 370/338 |
| 2011/0164520 A1* | 7/2011 | Kostic et al. | 370/252 |
| 2011/0275364 A1* | 11/2011 | Austin et al. | 455/423 |

* cited by examiner

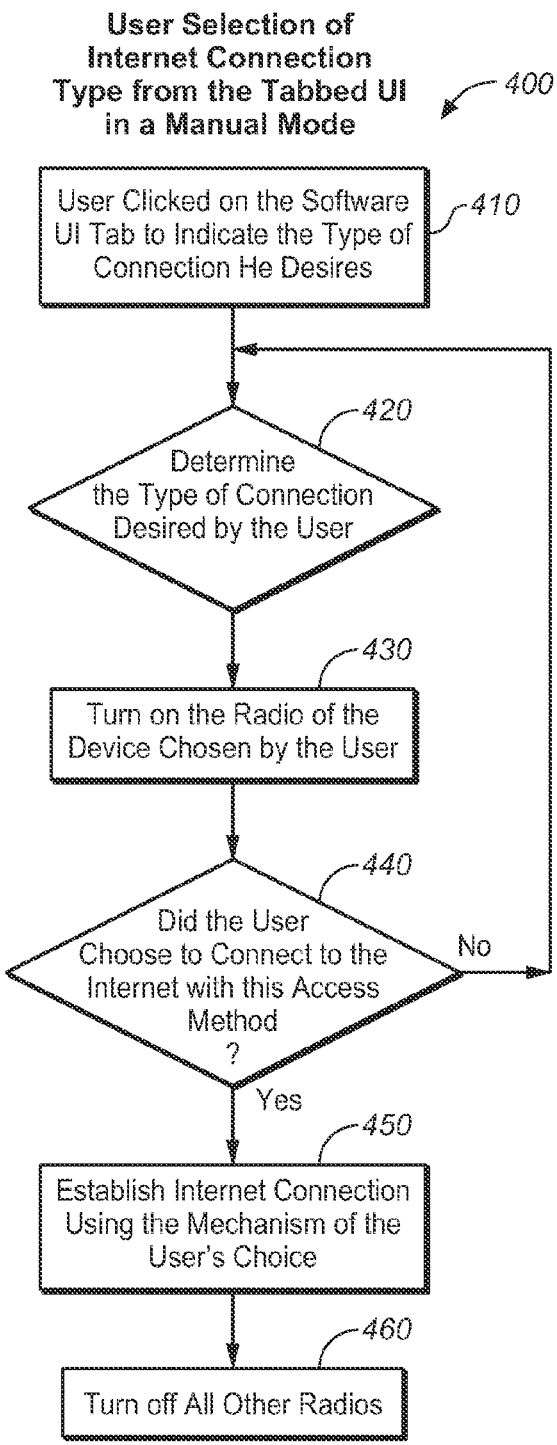
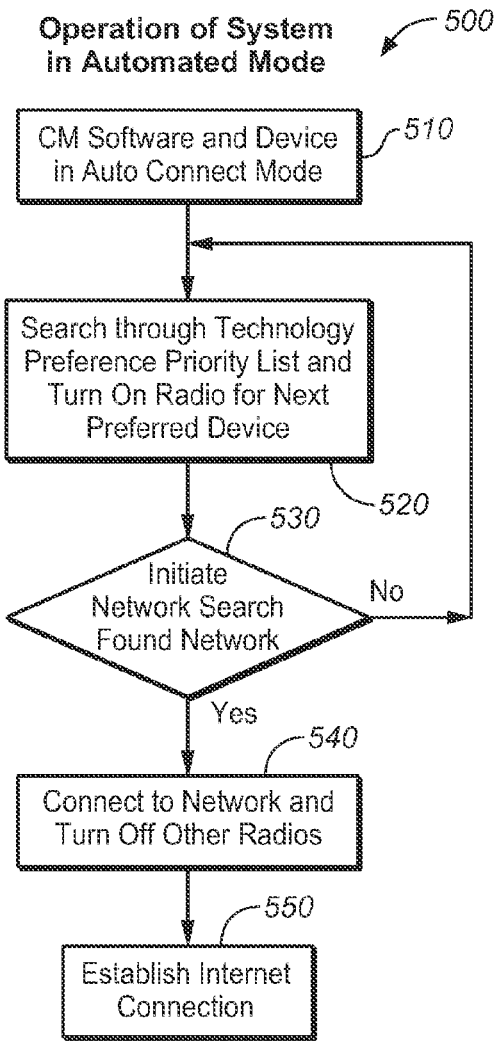
FIG. 4
FIG. 5

SYSTEM FOR ECO-FRIENDLY MANAGEMENT OF CONNECTED DEVICES

CROSS REFERENCES TO RELATED APPLICATIONS

Not applicable.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to utilizing a user's—choice of a network connection in conjunction with location grade-of-service (GoS) information during network switching while roaming, and then using such information to promote environmentally friendly (or "eco-friendly") management of wireless radios and other resources in a multi-radio device to save battery power based on available communication types. More particularly the present invention relates to a system and method for pinging presently non-active connection types at a slower rate than the active connection types, (assuming the user has a connection of some type) that still allow non-active connection types to be pinged at a less frequent interval to determine whether a connection is then possible (e.g., when the user has moved to a location where a connection may now be possible). Still more particularly, the present invention relates to a system and method for using the location information (actual coordinates of a mobile device) to "turn off" networks access devices for those network types that are known not to be in the area, thus significantly reducing power consumption by a multi-radio device.

2. Discussion of Related Art

Location information is used in a location-based service as a factor in determining when to switch connection type when roaming. A server is updated based on actual results from data points sent by connected devices, and those data points are then used to help determine when to "switch" connections while roaming for all devices in the local area in the future. The data points may include global coordinates in latitude and longitude (location), phone type, connection type (e.g., WiFi/CDMA/etc), signal strength, wireless provider, and so forth.

It would be advantageous to receive and use the above-described data points from the connected devices to build a "map" of what is available, wherein a "true" network grade of service map is dynamically updated based on connections of actual users in addition to previous connections from the connected device. By using this information, the system would recognize that a particular user is moving "out of" an area with good grade of service to an area that has better grade of service or to an area with a poor grade of service. The connected device would provide the user with warnings indicating that a service area is inferior, thus prompting the user to switch or take action by itself.

Devices equipped with multiple radios employ some form of connection management or session management software to manage connectivity associated with the devices. The typical functionality of such Connection Management software includes providing an interface to the user to facilitate connection to a wireless network, intelligently switching between networks, and provide other useful and well-known functions.

It would be further desirable, therefore, to enhance the Connection Management software and/or other such functionality in the device to add functionality enabling it to interact with the connected device's Operating System and/or the device drivers of the equipment using the wireless radios. Further, typically when a connected device equipped with multiple radio transceivers is powered up, the device comes up with all radios either turned on or in the last known state of the radios. Most users tend to leave the radios in that state, either because they are indifferent to the state of the radios, or because it is too difficult to change radio configurations. The present invention simplifies the selection of radio configurations and encourages users to select the most efficient configuration available, either manually or automatically.

BRIEF SUMMARY OF THE INVENTION

The present invention is a system and method for managing wireless network connections as well as the radios associated with making the wireless connections. The default behavior embedded in most device system software—including, but not limited to WINDOWS® 7, WINDOWS OS®, MAC OS®, ANDROID™, LINUX®, or variations thereof—do not have the ability to deal with the complexity associated with the management of multiple radios and associated environmental effects. The design of user interface of the software needs to be such that the actions taken, directly or by the natural movement of the user, automatically dictate the consequences of those decisions. [WINDOWS® and WINDOWS OS® are registered trademarks of Microsoft Corporation, Redmond, Wash.; MAC OS is a trademark of Apple, Inc., Cupertino, Calif.; ANDROID™, is a trademark of Google, Inc., Mountain View, Calif.; and LINUX™ is a registered trademark Linus Torvalds of Portland, Oreg.)

It is therefore a principal object of the present invention to provide a new and improved system and method to prevent large and needless consumption of power that results in rapid drainage of batteries, thereby leading to the need to recharge and replace batteries frequently. These actions increase electricity consumption, call for more manufacturing and disposal of batteries, and directly contribute to global warming, climate change, and increased toxin levels in landfills.

It is another object of the present invention to provide a new and improved method of creating and using a "map" of grade of service. Most telecommunication companies and mobile operators (Verizon, ATT, Sprint, etc.) have a "map" of its coverage areas. Most of the time such maps are either obsolete, inaccurate or highly optimistic. This inventive system provides software/technology onboard connected devices that creates an unbiased grade of service map based on actual reports from connected phones. The data points are sent through the system to a central server and include, but are not limited to, connection type, device battery level, signal strength, provider, location, and device type.

The present invention thus provides a method for connected devices to create an actual map of "grade of service" rather than a simple "coverage" map. A coverage map shows only where a given service provider may offer a signal of sufficient strength for connection to the system. The service provider may further classify the coverage map into a 2G, 2.5G or 3G coverage map based on the bearer's signal. A grade of service map, by contrast, takes into consideration the following parameters: (1) RSSI of the broadcast signal; (2) carrier-to-interferer ratios (or equivalents); (3) effective data rates (initial, sustained and average for the duration of connection); (4) throughput; (5) network capacity (measured as a "blocked data call"); (6) dropped connection; (7) type of device upon which the measurement was made; (8) carrier used when creating measurement; (9) date of measurement—such that changes in network coverage over time can be taken into account for connection decisions or displayed in a graphic map or other User Interface; (10) device battery level; and (11) other RF related parameters, however, not all of the parameters taken into consideration are identified above.

The information thus reported by a connected device using the inventive system and method is computed into a simplified "traffic light model." This model classifies a given location or region into a green (good), yellow (moderate) or red (poor) grade of service zones based on the attributes of the device and carrier in use.

Not only can the inventive system predict a likely "coverage outage" for a device in transit and intelligently handle the possible loss of connection during downloads, but it can create a "real" map that shows coverage patterns in greater detail than maps for currently available systems. The system and method includes not only wireless connectivity, but other connection types as well. The system is also not limited to use on mobile phones; rather, it includes software for use on any network enabled device with a radio connection—all of which can send reports of locations (assuming GPS or radio-based location is also available), and Wi-Fi strength/details on the connection. The inventive system essentially creates a grid on the entire earth that maps all reports of type/strength for any wireless connection, provider, and so forth, and could optionally be used by a device and device holder to decide what service provider to use in view of where they live or travel, in combination with actual present signal strength.

Furthermore, and as yet another object of the present invention, there is provided a method of intelligently balancing a selected connection type and/or device radio type according to available battery life. Various connection types and corresponding radios have differing bandwidth capabilities and consume power at different rates. In some instances it may be more prudent to switch to a slower connection and radio type in order to conserve battery power. This contrasts with the assumed default election of choosing the fastest available connection type. Thus, the present invention allows the user to manually select a slower connection in order to conserve power or, alternatively, the system software may do so automatically in response to a predetermined multi-factor analysis.

An additional object of the present invention is to discover, collect, rate, and report alternative networks in the vicinity of the connected network. This information can be expressly reported to the server or queued for later communication. This includes networks available using the same technology used for the current connection (if device hardware supports it) and additional technologies present in the device that are already scanning for available networks (if the hardware is not powered down).

It is yet another object of the present invention to provide a new and improved method of detecting the "true limits" of the network. The resulting information, collected from potentially thousands or millions of devices, can be used to create a true grade of service map of the world which is continuously and automatically updated. The grades may be visually depicted using a colored coded scheme. A green zone, for instance, can be used to show where there are no reported failures—either in whole, or specifically for the same type of device in question. A red zone shows where there are no reported successes. And a yellow zone can be scaled to indicate the likelihood of success. For Wi-Fi this is done with the basic service set identifier (BSSID) since access points (APs) can use the same SSID. "Reports" from other users in an "area" (both past and present), with a weighting toward more current reports from devices, are used to more accurately predict what is likely to happen to the connection assuming the same vector. That is, the inventive system uses information regarding present connection strength (i.e., signal strength), combined with the vector (direction in which the device holder is traveling) to predict future connection strength.

Yet another principal object of the present invention is to provide a method to correlate network ratings to the user's system. This enables general metrics to be correlated to past performance of the user's device. For instance, if an entirely yellow gradient is measured between 0-100, based on previous experience for this technology it may be determined that the user's device fails at, for instance, 54. Based on this information, the grade of service map can then be customized for that user and the user can be advised according to his or her device's performance. Stated another way, the system will draw a coverage area specific to the device carried. The user's device, the network he uses, other users on the same network, users with the same device, and the direction in which the user is moving, are all considered in predicting what is about to happen for that user in the system.

Data can be used to do the following:

(a) Download the coverage shape upon connection to the network. If the service degrades or drops, the user is informed which way he should move to regain service and to obtain better service based on the coverage shape. Again, this can be linked to past performance of the user's device (as well as other results from different devices in the past). Ratings are based not just on what is happening to the current user but to others in the same area (past and present). A determination is made of the type: "If the user moves to yellow level 80 (30 feet north, their Wi-Fi connection will be excellent instead of 'poor but usable'."

(b) Download adjacent and alternative networks in the area and provide advice on better service using many metrics. If coverage drops, users are immediately notified with a user interface element indicating options. Triggers can be automatically predicted based on past experience of network failures for a specific device type correlated with collected statistics and providing advance warning of coverage drop. Trigger padding can automatically be applied warning of coverage drop well before it is likely to happen. Triggers can be automatically adjusted (and increased) if network coverage terminates before expected. Moreover, GPS location and travel velocity can be used to predict network failure. If the device is predicted to enter an area where failure is likely within some adjustable time limit, alternatives may be presented.

Various software metrics may be employed to rate networks, including:

(a) Technology and the area coverage, followed by rating the system, as possible, either as Excellent, Good, Normal, Fair, or Bad, based on how the coverage area of the particular location compares to other similarly tracked networks.

(b) Assigning metrics based on the duration of usage. For instance, if a user stays stably and reliably connected for a long period (8 hours, for instance), this indicates that the service is likely quite good. If, on the other hand, connections last for short periods of time only and the connections include frequent drops and disconnections from the same station, then the service may be deemed inferior.

(c) Assigning metrics based on repeat usage. If a device repeatedly uses a particular service and connection, it is deemed stable. A software metric is then used—such as 30% of all users are repeat users.

(d) Popularity metrics. These metrics may comprise a comparison between other networks of the same kind in the system.

(e) Rating the network based on how it is different from the carrier's estimation. This metric includes references to published network maps from common carriers and compares actual results from devices on that network.

A still further object of the present invention is to provide a method to automatically detect and disable an active transmission device while traveling on an airplane. When applied, the method assumes that the device holder has forgotten to disable the network communication functionality of the device. Since the device cannot legally be used while in flight, the inventive method is a power saving feature that disables network hardware contained in the device. This can be accomplished using a two step algorithm with an additional optional automatic functionality to return the device to its operational state when the airplane arrives at the destination airport. The inventive system detects when the device is inside or near an airport. This is done using GPS coordinates or by detecting the presence of a network known to include portions of the airport. This includes the connected network and/or a network detected by unconnected hardware which is powered on and scanning within the device.

Another object of the present invention is to provide a method for detecting when a network enabled device is on an airplane that is in the process of taking off or in the early stages of flight. This is accomplished using a GPS-enabled device, wherein the GPS is sampled and it is determined that the holder's device is moving faster than some predefined value (e.g., 200 mph). and/or the altitude of the device changes at some predefined rate (e.g., 500 ft/min). In the alternative, and in the event a GPS device is not present or powered off, it is possible to detect that the device moves through enough network service zones in a short enough period of time, and if such a condition is detected, the system can determine that the device is moving at speeds greater than typical terrestrial (automobile) speeds; for example, movement of faster than 100 mph.

Further, it is an object of the present invention to provide a method for a network enabled device to detect when a airplane has arrived at a destination airport and to automatically return the hardware in the device to a previous state. This can be accomplished by having GPS hardware in the device detect and report that the device is no longer moving and/or that the device has been at ground level for the airport location.

Accordingly, the present invention provides a system and method that relieves a device user of the need to make network connection decisions and to intelligently make those decisions on behalf of the user. The decisions will help the user conserve battery life and, in turn, help the environment by consuming less power from the device.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 4 is a schematic flow chart illustrating the method steps of the inventive system when a user manually selects an Internet connection type from the tabbed user interface while in manual mode;

FIG. 5 is a schematic flow chart illustrating the method steps of the system while operating in automated mode;

FIG. 6 is a schematic flow chart illustrating the intelligence built into the inventive system using GPS-based tracking for automatically enabling and disabling the connected wireless device when traveling by airplane; and.

DETAILED DESCRIPTION OF THE INVENTION

Definitions: As used herein, the term "Battery Life" is calculated using the following formula: Battery Life (Hour) =Battery Capacity (WHr)/Device Power Consumption (Watts)

Figure 1:
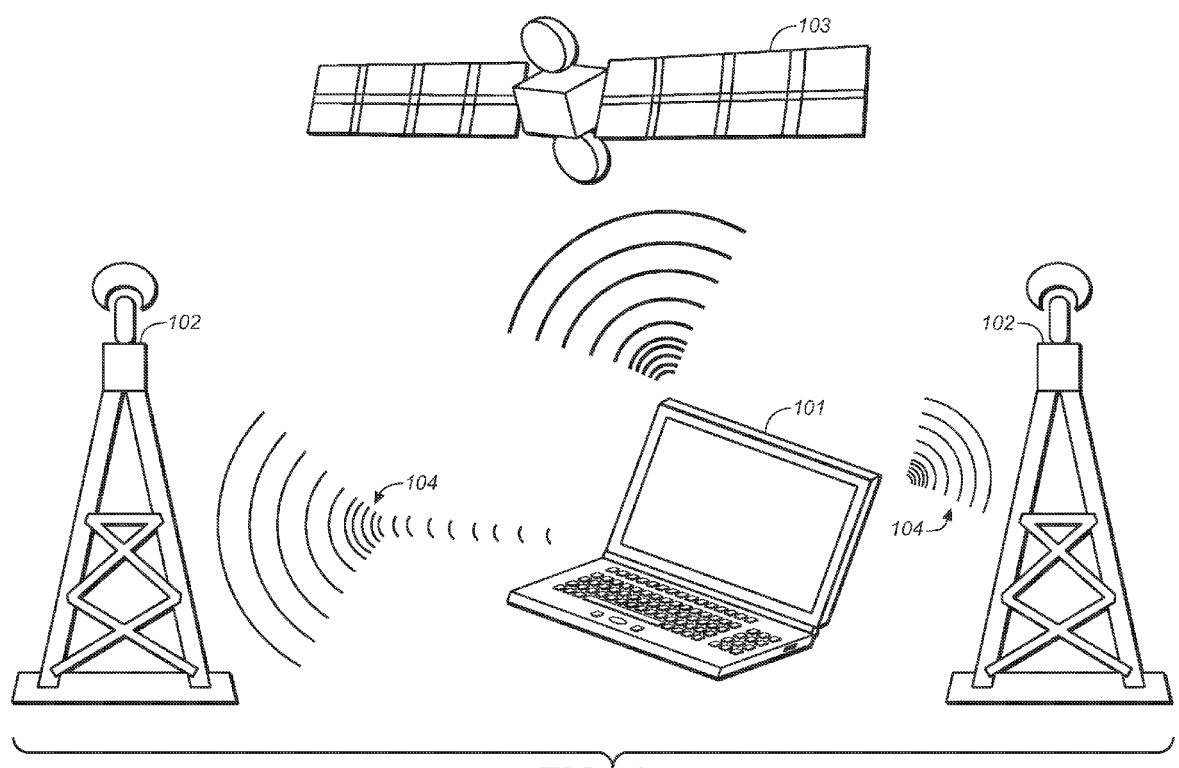
FIG. 1 is a schematic diagram illustrating the general telecommunications environment in which the inventive system is practiced.

Referring first to FIG. 1, there is shown in greatly simplified schematic form the typical telecommunications environment in which devices using the invention system are used. The elements comprising the environment include a network enabled device 101 equipped with multiple radios having some kind of connection management or session management software to manage connections (including handovers) to fixed location transceivers, such as cellular radio towers 102, and to satellites 103 (e.g., GPS satellites), using radio or other electromagnetic signals 104.

Figure 2:
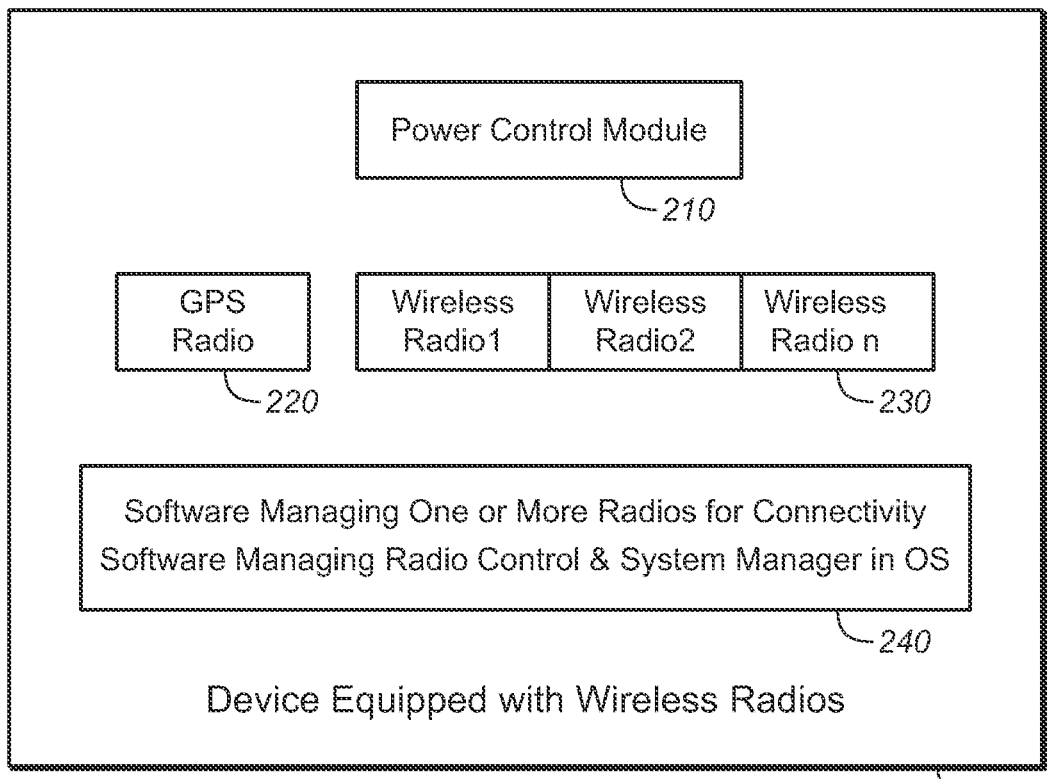
FIG. 2 is a schematic block diagram illustrating the general functional elements of a device equipped with multiple wireless radios and incorporating the inventive system for managing connectivity of the device.

Referring next to FIG. 2, there is shown in simplified schematic form the kind of network enabled device 200 referred to above. This device includes a power control module 210, a GPS radio 220, multiple communications transceivers 230, and software for managing radio control and the system manager as well as radio connectivity.

Figure 3:
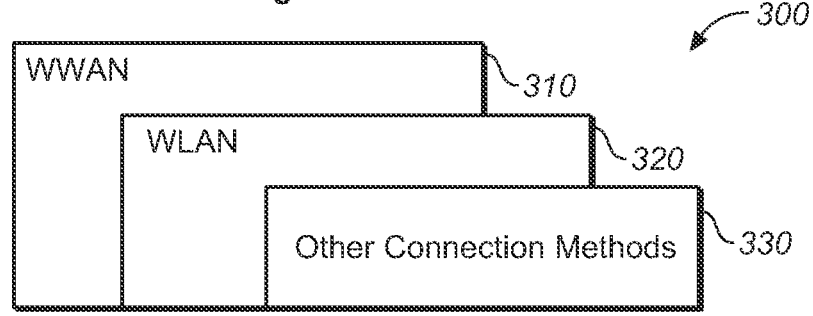
FIG. 3 is a schematic diagram illustrating a portion of a tabbed user interface of the connection management or radio control software employed in the present invention.

FIG. 3 is a highly simplified schematic diagram showing a small portion of a tabbed user interface 300 of a connection management software that enables the user to choose the radio interface or technology that the user wishes to use to connect to the Internet, including WWAN 310 and WLAN 320 (the latter which is used synonymously with IEEE 802.11-wireless LAN), and other connection methods 330. The implementation is possible through other user interface design as well. However, the present invention uses a tabbed user interface by way of example. Thus, if a user holding a device at a Wi-Fi location (hotspot, home or corporate office) clicks on the Wi-Fi tab, it displays all available Wi-Fi networks and the user can either manually or automatically connect to one of the available Wi-Fi networks. Based on the user's choice the software can make a decision on whether to change the state of the other radios in the device.

It must be emphasized that in virtually all real world scenarios, most (if not all) users holding a multi-radio connected device have no reason to use more than one radio at a time. Thus, when a wireless device is connected to a Wi-Fi access point, there is no reason for the device user also to connect to a WWAN (HSPA or EV-DO) network. Even so, in majority of the devices presently used for wireless connections, a WWAN radio continues to be switched on even when a Wi-Fi connection is established. This is generally not understood or appreciated by the user, but it is a considerable waste of power resources on the device, as well as an environmentally "hostile" method of using the device. Thus, the present inventive method makes the wireless computing device to be more energy efficient and "green."

Referring next to FIGS. 4 and 5, it will be seen that the inventive method may be employed either manually or automatically, respectively, to determine and connect to the best available network and then to manage power consumption. FIG. 4 is a flow diagram 400 showing the typical steps involved when the device holder interacts with the device through a user interface to make a selection of a specific access method to establish an Internet connection. The manual mode forces the user to click 410 on one of the WWAN or WLAN or Other Connection Method tabs of the UI, thereby selecting the kind of connection desired. The system determines 420 the type of connection desired by the user and turns on the radio 430 associated with the access method selected by the user. The Connection Management software thus knows that the user has chosen the preferred access method and can therefore make an assumption, in majority of the cases, that the user has no need for other radios. Therefore, the Connection Management software confirms the selected access method 440 and when confirmed establishes the Internet connection 450 using the radio or the user's choice. It then turns off 460 other mobile broadband radios associated with access methods not selected by (e.g., the WLAN radio or Blue Tooth Radio, etc, when WWAN is the selected access method). When the confirmation step 440 returns a "No," the system loops back to the step of determining the type of connection desired by the user.

Referring next to FIG. 5, there is seen a schematic flow diagram 500 showing the operation of the inventive system in automatic mode. With the Computer Management software and the device in automatic mode 510, the system automatically searches a technology preference and priority list and turns on 520 the radio associated with the device next appearing in the list. The system next initiates a search 530 to locate a network with which to connect, and if a network is found, the system connects 540 to the network and turns off radios not involved in the network connection. An Internet connection is thereby established 550. If a network is not located at search step 530, the system returns to searching the technology preference list and turns on the radio for the next preferred connection access technology 520, and the process repeats until a connection is established or the available technologies are exhausted.

Figure 6:
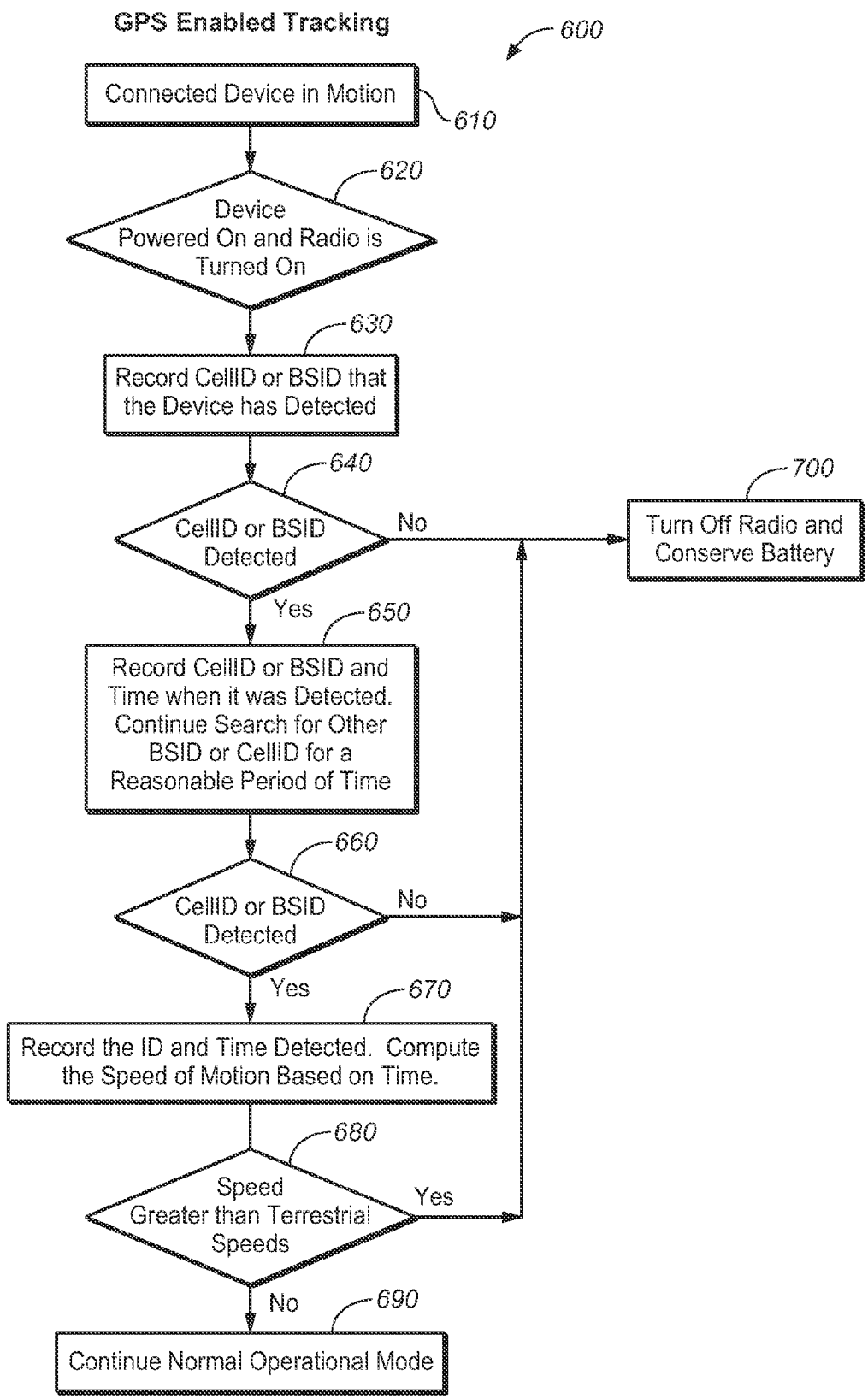

FIG. 6 is a schematic flow diagram 600 showing the inventive GPS-based method for tracking and automatically enabling or disabling connected wireless device when traveling by airplane. This feature of the inventive system is triggered when the connected device is in motion 610. If at decision block 620 the device is determined to be powered on and the radio is turned on, the Cell Global Identity ("Cell ID") or Base Station ID ("BSID") is recorded 630. Then, if at decision block 640 either the CellID or BSID are detected, the time of detection is recorded and searching for other CellIDs or BSIDs is continued for a reasonable period of time 650. If a second CellID or BSID is detected 660, the ID and time of detection are recorded and the speed of motion is of the connected device is computed 670. If at decision block 680 the computed speed is not greater than terrestrial speeds, the system continues normal operation 690. If, on the other hand, at decision block 680 the speed is computed to be greater than terrestrial speeds (as would be expected for airplane flight), or if at decision block 640 a Cell ID or BSID is not first detected, the device radios are turned off 700 to conserve battery power.

Figure 7:
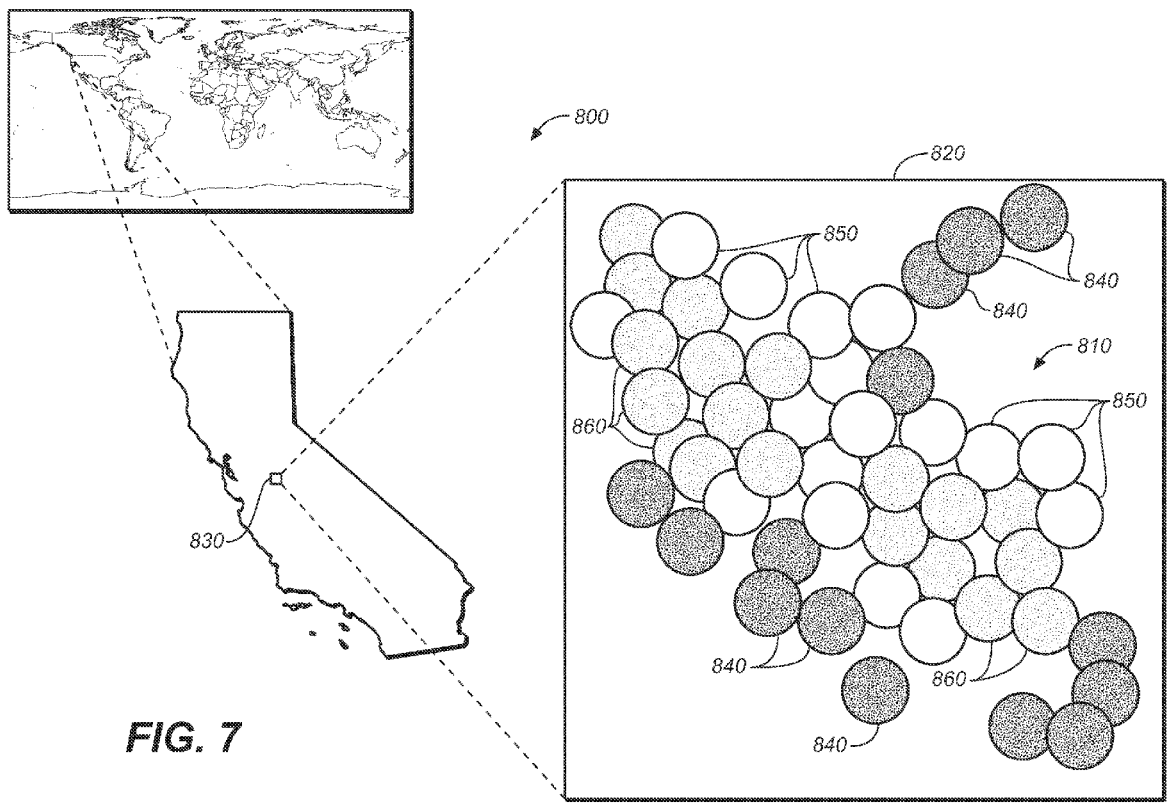
FIG. 7 is a schematic diagram illustrating the concept of a "Network coverage map," in which circles having the highest density of dots signify "red" locations, or areas in which signal strength is determined to be poor, circles with no dots are "yellow" locations that have fair signal strength, and circles with medium dot density are "green" locations where signal strength is good to excellent.

FIG. 7 is a schematic diagram illustrating a network coverage map 800 for use with the present invention. This kind of coverage a map is synthesized from a number of data points and depicts coverage through a variety of colored circles 810 superimposed on a detailed view 820 of an area map 830. The circles, shown herein in black and white, include "red" circles 840 depicted here with a high density of dots and which signify areas in which signal strength is determined to be poor; "yellow" circles 850, shown with no dots and which signify locations that have fair signal strength; and "green" circles 860, depicted with medium dot density and signifying locations where signal strength is good.

The present invention enables wireless device manufacturers and device end users to more creatively manage battery life in a device, owing to the software technology available in multi-radio devices. For example, rather than use a default setting for a battery savings mode, a user can indicate, for instance, that he is going to be on a 5 hour flight and would like the battery to last 5 hours. In response to this indication, the inventive software will logically chose all the device settings required to meet this specification as closely as possible.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A method of managing wireless network connections and device radios signals in an active transmission device, and for managing and conserving battery life in the active transmission device, wherein the active transmission device includes, multiple radio transceivers, a user interface, and software for managing radio control and radio connectivity, said method comprising the steps of:
- (a) searching an access method preference and priority list;
- (b) turning on the device radios signals associated with the active transmission device next appearing in the access method preference and priority list;
- (c) searching to locate a network with which to connect that is available in a particular area based on the device location on a true grade of service map;
- (d) connecting to a found network using the associated device radios;
- (e) turning off device radios not involved in the network connections using the device location information;
- (f) aggregating actual reports from a plurality of active transmission devices, wherein the actual reports comprise data points that include connection method, device battery level, signal strength, provider, location, and type of active transmission device; and
- (g) updating said true grade of service map based on the actual reports aggregated in step (f), wherein the actual reports further include a RSSI of the broadcast signal, carrier-to-interferer ratios or equivalents thereof, effective data rates, throughput, network capacity, dropped connection, type of device upon which the measurement was made, a carrier being used when creating the measurement, and the date of measurement.

2. The method of claim 1, further including the step of:
- (h) classifying given device locations on said true grade of service map as good, fair, or poor connection locations and representing each classification by a color code on the map.

3. The method of claim 1, further including the step of:
- (i) customizing said true grade of service map for the performance of a particular user device.

4. The method of claim 1, further including the steps of:
- (j-1) determining whether a wireless connected device in a GPS location is powered on and its radios signals turned on;
- (j-2) searching for a Cell ID or BSID available in the particular area based on the device location on said true grade of service map;
- (j-3) turning off the device radios if no Cell ID or BSIDs are detected in the area using the device location information;
- (j-4) recording the Cell ID or BSID of any detected Cell ID or BSID as well as the time of detection;
- (j-5) searching for other Cell IDs or BSIDs for a predetermined period of time;
- (j-6) recording the ID and time of detection of any second Cell ID or BSID detected;
- (j-7) calculating the speed of motion (velocity) of the connected device;
- (j-8) continuing normal device operation if the computed speed is not greater than terrestrial speeds; and
- (j-9) turning off the device radios if the calculated speed is greater than terrestrial speeds.

5. The method of claim 4, further including the step of providing a graphic map based on changes in network coverage over time in the GPS location.

6. The method of claim 4, whereby the GPS location and velocity are used to predict imminent network failure and provide alternatives.

7. The method of claim 5, further including the step of directing the device user to improved network coverage using the predicted network boundaries and GPS data.

8. The method of claim 1, further including the step of:
- (k) intelligently balancing a selected network connection and corresponding device radio according to available battery life.

9. The method of claim 1, wherein the network connections and corresponding device radios have differing bandwidth capabilities and consume power at different rates.

10. The method of claim 1, wherein the grade of service map is dynamically updated based on the network connections and corresponding device radios in addition to previous connections from the connected device.

11. The method of claim 4, further including the step of:
- (l) detecting and reporting the device status when it is no longer moving and/or at ground level based on GPS location information.

12. The method of claim 4, further including the step of:
- (m) automatically predicting network failure of a specific network enabled device based on correlated statistics created from said true grade of service map; and
- (n) providing a warning of imminent coverage drop.

* * * * *